US011976850B2

(12) United States Patent
Adanur et al.

(10) Patent No.: US 11,976,850 B2
(45) Date of Patent: May 7, 2024

(54) LEAK DETECTION IN TANKLESS WATER HEATER

(71) Applicant: Rheem Manufacturing Company, Atlanta, GA (US)

(72) Inventors: Burak Adanur, Montgomery, AL (US); Prudhvi Amaravadhi, Montgomery, AL (US); Tristin R. Watteau, Auburn, AL (US); Emil J. Antoon, Montgomery, AL (US); Jeffrey Stogsdill, Montgomery, AL (US)

(73) Assignee: Rheem Manufacturing Company, Atlanta, GA (US)

(*) Notice: Subject to any disclaimer, the term of this patent is extended or adjusted under 35 U.S.C. 154(b) by 0 days.

(21) Appl. No.: 17/520,759

(22) Filed: Nov. 8, 2021

(65) Prior Publication Data

US 2023/0141828 A1    May 11, 2023

(51) Int. Cl.
*F24H 9/20* (2022.01)
*G01M 3/18* (2006.01)

(52) U.S. Cl.
CPC .......... *F24H 9/2028* (2013.01); *G01M 3/183* (2013.01)

(58) Field of Classification Search
None
See application file for complete search history.

(56) References Cited

U.S. PATENT DOCUMENTS

| | | | | |
|---|---|---|---|---|
| 9,916,748 | B1* | 3/2018 | Yadvish | E03B 7/071 |
| 10,753,647 | B2* | 8/2020 | Gardner | F24H 9/2007 |
| 2005/0116725 | A1* | 6/2005 | Raymond | G01M 3/165 |
| | | | | 324/693 |
| 2006/0244616 | A1* | 11/2006 | Hill | G01M 3/045 |
| | | | | 359/512 |
| 2008/0211680 | A1* | 9/2008 | Turner | G08B 21/20 |
| | | | | 340/604 |
| 2009/0284382 | A1* | 11/2009 | Hill | G01M 3/165 |
| | | | | 340/604 |
| 2010/0086289 | A1* | 4/2010 | Johnson | F24H 1/142 |
| | | | | 219/482 |
| 2010/0212752 | A1* | 8/2010 | Fima | F24H 15/335 |
| | | | | 137/87.03 |
| 2019/0094097 | A1* | 3/2019 | Cavalheiro | G08B 21/20 |
| 2019/0170398 | A1* | 6/2019 | Chaudhry | F24H 9/2007 |
| 2021/0063268 | A1* | 3/2021 | Berlovan, Jr. | G01M 3/40 |

* cited by examiner

*Primary Examiner* — Kristina M Deherrera
*Assistant Examiner* — Mark A Shabman
(74) *Attorney, Agent, or Firm* — Eversheds Sutherland (US) LLP

(57) ABSTRACT

The present disclosure provides a device and a method for detecting leak in a tankless water heater. According to the present disclosure, a leak detection device is disposed on a base of the tankless water heater. The leak detection device includes a leak sensor and at least one absorption arm extending from the leak sensor. The absorption arm wicks water and transports the wicked water towards the leak sensor. The leak sensor generates a signal indicative of leakage in the tankless water heater, in response to sensing wetness.

20 Claims, 4 Drawing Sheets

LEAK DETECTION IN TANKLESS WATER HEATER

TECHNICAL FIELD

The present disclosure relates, in general, to tankless water heater and, more specifically relates, to a leak detection device for the tankless water heater.

BACKGROUND

Typically, a water heater may be subject to deterioration over course of its life. Such deterioration may compromise integrity of the water heater and may, for example, cause water leak besides other issues. In case of tankless water heater, water may leak into a cabinet of the tankless water heater from fittings or couplings and eventually pool at a base of the tankless water heater. Since the tankless water heater has a sealed cabinet, leaked water may accumulate internally. If left undetected and unattended, progress of such water leaks may cause damage to electrical equipment and other components and may result in costly repairs. Therefore, it is important to detect the leak as early as possible in the tankless water heaters.

SUMMARY

According to one aspect of the present disclosure, leak detection device for a tankless water heater is disclosed. The leak detection device includes a leak sensor and at least one absorption arm extending from the leak sensor. The absorption arm is configured to (i) wick water and (ii) transport the wicked water towards the leak sensor. Further, the leak sensor is configured to generate a signal indicative of leakage in the tankless water heater, in response to sensing wetness.

In an embodiment, the absorption arm of the leak sensor extends along a base of the tankless water heater. The absorption arm absorption arm is made of one of polyester, polypropylene, merino wool, nylon, or micromodal. In some embodiments, diameter of the absorption arm is in a range of about 0.1 inches to about 0.2 inches and thickness of wall of the absorption arm is in a range of about 0.001 inches to about 0.1 inches. In some embodiments, the leak sensor in configured to generate the signal based on an electrical resistance change corresponding to the sensed wetness. In an embodiment, the leak sensor is configured to couple with a notification device. In some embodiments, the leak sensor is configured to operate in a temperature range of about 30° F. to about 200° F.

According to another aspect of the present disclosure, a tankless water heater is disclosed. The tankless water heater includes a leak detection device configured to detect a water leak in the tankless water heater. The leak detection device includes a leak sensor and at least one absorption arm extending from the leak sensor. The absorption arm is configured to (i) wick water and (ii) transport the wicked water towards the leak sensor. Further, the leak sensor is configured to generate a signal indicative of leakage in the tankless water heater, in response to sensing wetness. The tankless water heater also includes a controller coupled with the leak detection device and configured to receive the signal from the leak sensor and actuate a notification device to provide a notification regarding the detected leak in the tankless water heater.

In an embodiment, the leak detection device is disposed on a base of the tankless water heater. The absorption arm is coupled to the base of the tankless water heater with one or more coupling members, such as a magnetic clip, an adhesive, or a vacuum cup. In an embodiment, a free end of the absorption arm is located away from condensation regions in the tankless water heater.

According to yet another aspect of the present disclosure, method of detecting leak in a tankless water heater is disclosed. The method includes wicking water by at least one absorption arm, transporting wicked water towards a leak sensor, generating a signal indicative of leakage in the tankless water heater, in response to sensing wetness, and providing a notification regarding detected leak in the tankless water heater, corresponding to the sensed wetness.

In some embodiments, the method also includes causing a change in electrical resistance in the leak sensor in response to sensing wetness.

These and other aspects and features of non-limiting embodiments of the present disclosure will become apparent to those skilled in the art upon review of the following description of specific non-limiting embodiments of the disclosure in conjunction with the accompanying drawings.

BRIEF DESCRIPTION OF THE DRAWINGS

A better understanding of embodiments of the present disclosure (including alternatives and/or variations thereof) may be obtained with reference to the detailed description of the embodiments along with the following drawings, in which.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

As used herein, the terms "a", "an" and the like generally carry a meaning of "one or more," unless stated otherwise. Further, the terms "approximately", "approximate", "about", and similar terms generally refer to ranges that include the identified value within a margin of 20%, 10%, or preferably 5%, and any values therebetween.

Figure 1:
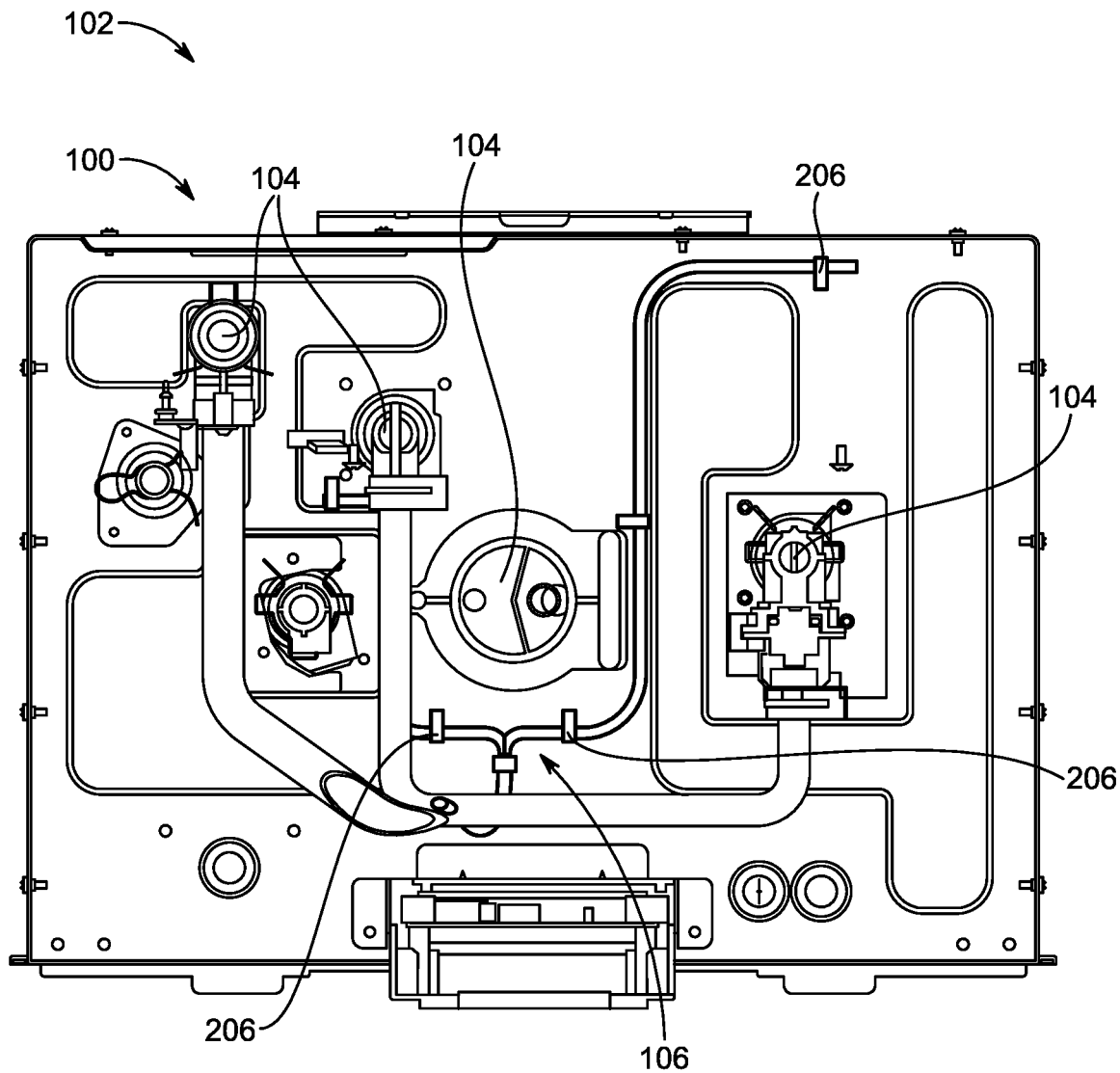
FIG. 1 is an exemplary view of a base of a tankless water heater, according to an embodiment of the present disclosure.

Aspects of the present disclosure are directed to a device and a method of detecting leak in a tankless water heater. Referring to FIG. 1, an exemplary view of a base 100 of a tankless water heater 102 is illustrated. The base 100 defines one or more apertures configured to allow piping connecting extending through the base 100 or connecting with the base 100. For the purpose of the present disclosure, such apertures are considered as water outlets 104 defined in the base 100. As used herein, the term "water outlets" includes (i) connections, such as piping connectors, coupled to the base 100, configured to allow flow of water therethrough, and (ii) pipes extending through the apertures defined in the base 100. In case of water leakage through such water outlets 104, functioning of components located on the base 100 may be disturbed and may render the components non-functional. In order to detect the leakage, the tankless water heater 102 includes a leak detection device 106. According to an aspect of the present disclosure, the leak detection device 106 is disposed on the base 100 of the tankless water heater 102. However, location of the leak detection device 106 should not be construed limiting. In some embodiments, the leak detection device 106 may be located along walls of the tankless water heater 100, albeit with few variations to the aspects described herein.

Figure 2:
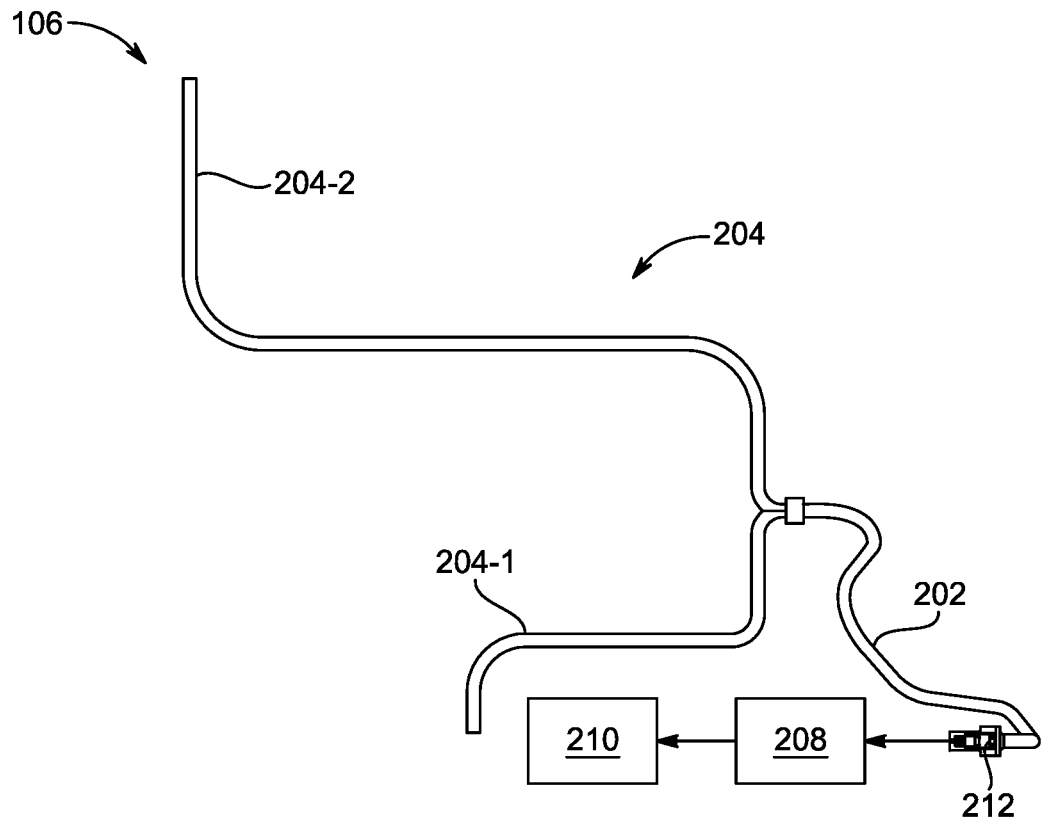
FIG. 2 is an exemplary top view of a leak detection device, according to an embodiment of the present disclosure.

FIG. 2 illustrates an exemplary top view of the leak detection device 106. In an embodiment, the leak detection device 106 includes a leak sensor 202 and at least one absorption arm 204 extending from the leak sensor 202. Preferably, the leak sensor 202 is implemented as an electronic unit. As seen in the FIG. 2, two absorption arms, namely a first absorption arm 204-1 and a second absorption arm 204-2. However, the number of absorption arms should not be considered as limiting and the leak detection device 106 may include more than two absorption arms 204. In an embodiment, the absorption arms 204 are flexible in structure and may be made of polyester, polypropylene, merino wool, nylon, micromodal, or any equivalents thereof.

The first absorption arm 204-1 and the second absorption arm 204-2 extends along the base 100 of the tankless water heater 102. Particularly, free ends of the first absorption arm 204-1 and the second absorption arm 204-2 are located proximal to the water outlets 104 defined in the base 100. In an embodiment, one or more coupling members 206 are used to couple the first absorption arm 204-1 and the second absorption arm 204-2 on the base 100, thereby retaining the arms intact during relocation of the tankless water heater 102. Preferably, the coupling members 206 are embodied as a magnetic clip, an adhesive, a vacuum cup, or any other method known to a person skilled the art and may be coated with a chemical composition to eliminate rusting. In some embodiments, the base of the tankless water heater 102 may includes fixtures to secure the first absorption arm 204-1 and the second absorption arm 204-2.

Each of the first absorption arm 204-1 and the second absorption arm 204-2 is configured to wick water and transport the wicked water towards the leak sensor 202. In some embodiments, diameter of each of the first absorption arm 204-1 and the second absorption arm 204-2 may be in a range of about 0.1 inches to about 0.2 inches and thickness may be about 0.001 inches to about 0.1 inches. The leak sensor 202 is configured to generate a signal indicative of leakage in the tankless water heater 102, in response to sensing wetness. In an embodiment, the leak sensor 202 is configured to generate the signal based on an electrical resistance change corresponding to the sensed wetness.

During leakage within the tankless water heater 102, leaked water accumulates in the base 100. As described earlier, the water outlets 104 are potential source of water leaks. Since the first absorption arm 204-1 and the second absorption arm 204-2 extend proximal to each of the water outlets 104, the leaked water may be easily wicked by aid of capillary action. Over time, gradually amount of water leaked into the base 100 may increase and the absorption arms 204 continuously wick the leaked water from the base 100. By virtue of characteristic of the absorption arm 204, the wicked water moves along respective lengths of each of the first absorption arm 204-1 and the second absorption arm 204-2, thereby wetting dry portions of the arms 204. Such movement of the leaked water along the respective lengths of the arms 204 may be understood as "transport of wicked water", as used in the present disclosure. Upon sensing presence of the leaked water or sensing wetness, the leak sensor 202 generates the signal indicative of leakage. In some embodiments, the leak sensor 202 is configured to operate in a temperature range of about 30° F. to about 200° F.

Often water carrying pipes in the tankless water heater 102 may be subjected to condensation, such as dropwise condensation. Condensed water may flow down along the length of such water carrying pipes and condensed water gets collected in the base 100 of the tankless water heater 102. However, condensation may occur for a short time period, thereby resulting in low amount of water collected in the base 100. As such, amount of the condensed water when wicked may not be sufficient to travel towards the leak sensor 202. Therefore, instances of generating the signal in case of wicking condensation water may be eliminated, thereby overcoming false indications, and rendering the leak detection device 106 efficient. In some embodiments, the free ends of the first absorption arm 204-1 and the second absorption arm 204-2 may preferably be located away from condensation regions in the tankless water heater 102. It is contemplated the free ends of the absorption arm 204 may not be necessarily located around the water outlets 104, but more proximal to potential water leak locations within the tankless water heater 102.

In an embodiment, the tankless water heater 102 includes a controller 208 coupled to the leak detection device 106. The controller 208 may be integrated in the tankless water heater 102 and may be configured to perform multiple functions related to the tankless water heater 102, as known a person skilled in the art. The leak sensor 202 includes a connecting member 212 configured to couple with the controller 208. In an embodiment, the controller 208 may be implemented as a processor, such as one or more microprocessors, microcomputers, digital signal processors, central processing units, state machines, logic circuitries, or any devices that manipulate signals based on operational instructions. Among other capabilities the processor may be configured to fetch and execute computer-readable instructions stored in a memory 136 thereof. Various functions of the processor may be provided using dedicated hardware as well as hardware capable of executing software in association with appropriate software. When provided by the processor, the functions may be provided by a single dedicated processor, by a single shared processor, or by a plurality of individual processors. Moreover, explicit use of the term "processor" should not be construed to refer exclusively to hardware capable of executing software, and may implicitly include, but not limited to, digital signal processor (DSP) hardware, network processor, application specific integrated circuit (ASIC), field programmable gate array (FPGA), read only memory (ROM) for storing software, random access memory (RAM), and non-volatile storage. Other hardware known to a person skilled in the art may also be included.

The controller 208 is configured to receive the signal from the leak sensor 202 and actuate a notification device 210 to provide a notification regarding the detected leak in the tankless water heater 102. The controller 208 may be configured to determine the water leak based on the signal from the leak sensor 202. For example, a change in value associated with the signal from the leak sensor 202 may be indicative of the water leakage. The notification device 210 may be one of, for example, a display unit integrated with the tankless water heater 102, a display unit mounted on the tankless water heater 102 but not considered as an integral component of the tankless water heater 102, or a user device located remotely from the tankless water heater 102 and in wireless communication with the controller 208. As such, besides other capabilities, the controller 208, with aid of other components, may be configured to establish wireless communication with the remote user device to provide the notification, such as Econet notification, regarding the detected leak. In an example, the notification may an audio alert, or an audio alter combined with vibration alert. In some embodiments, multiple devices, such as display unit on the tankless water heater 102 and the remote user device, may be connected to the controller 208 to simultaneously receive the notification. Upon receiving such notification, user of the tankless water heater 102 may take corrective action to mitigate the water leakage within the tankless water heater 102. Therefore, the leakage detection device 106 may help avoid damage to components of the tankless water heater 102 by providing real-time notification regarding the water leakage. In some embodiments, multiple tankless water heaters may be connected together to function as a single heating system and the signal indicative of leak in any of the tankless water heater may be provided to a master controller. In such an arrangement, the master controller may be configured to notify the user about the potential water leak and indicate tankless water heater in which the water leak is detected.

Figure 3:
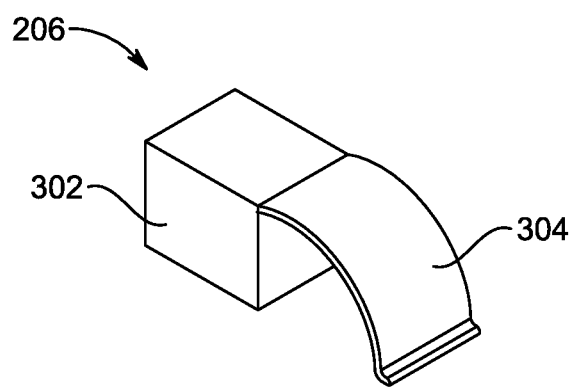
FIG. 3 is a an exemplary coupling member of the leak detection device, according to an embodiment of the present disclosure.

FIG. 3 illustrates an exemplary coupling member 206, according to an embodiment of the present disclosure. The coupling member 206 includes a support portion 302 and a securing portion 304. In cases where the coupling member 206 is implemented as the magnetic clips, the support portion 302 may be made of magnetic material, such as Neodymium magnets, configured to couple to the base 100 of the tankless water heater 102 with strong magnetic force. The securing portion 304 is configured to conform to an outer surface of the absorption arm 204, thereby retaining the absorption arm 204 in position. Therefore, the coupling members 206 ensure that the absorption arm 204 is retained proximal to the water outlets 104 at all times. In cases where the coupling members 206 are implemented as vacuum cups, the support portion 302 may include a vacuum developing membrane configured to grip the support portion 302 at desired location on the base 100 of the tankless water heater 102. Therefore, the coupling member 206 of the present disclosure eliminate need for screws in the tankless water heater 102. Other known securing members may be apparent to the person skilled in the art from the description herein.

Figure 4:
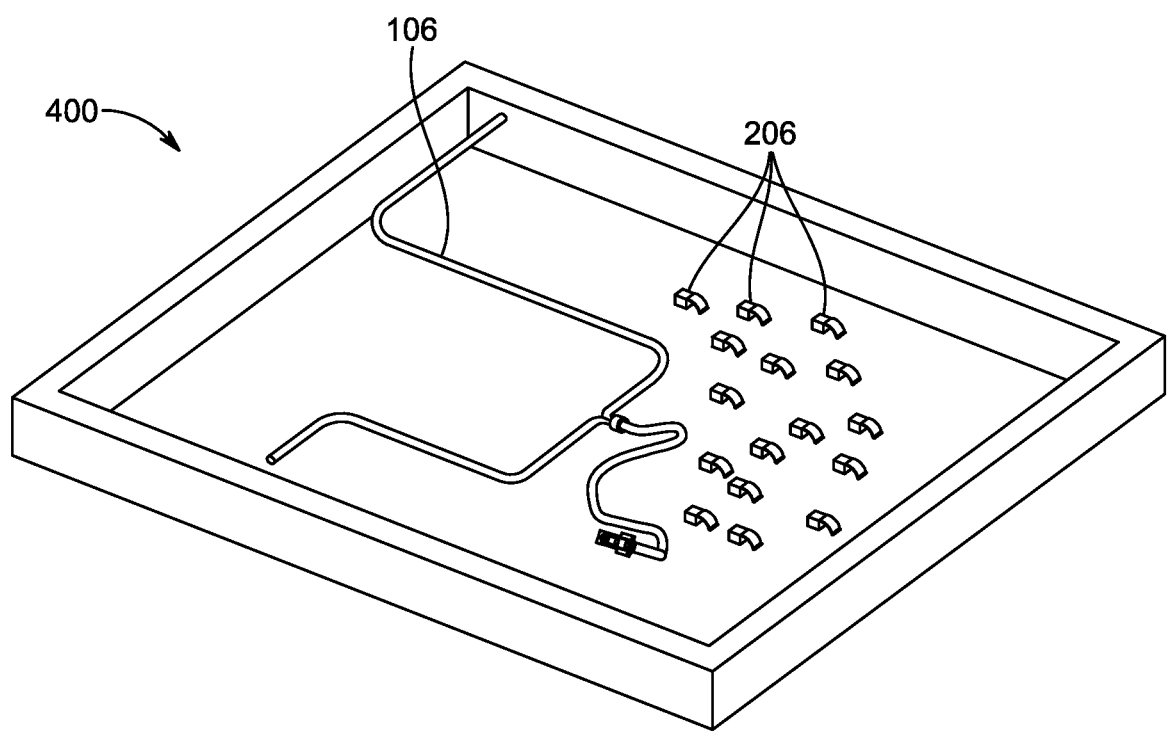
FIG. 4 shows a leak detection kit, according to an embodiment of the present disclosure.

FIG. 4 illustrates an exemplary leak detection kit 400 for the tankless water heater 102, according to an embodiment of the present disclosure. The leak detection kit 400 includes the leak detection device 106 and a plurality of coupling members 206. In some embodiments, the leak detection kit 400 may include more than one leak detection device 106. Besides the plurality of coupling members 206 and the leak detection device 106, the leak detection kit 400 may include other components, for example, a dedicated control box for leak detection having a controller and a display unit. With such components in the leak detection kit 400, the leak sensor 202 may be easily coupled to the dedicated controller. The leak detection kit 400, therefore, allows retrofitting the leak detection device 106 to tankless water heaters 102 which do not include a built-in leak detection feature or allows replacing a faulty leak detection unit. To this end, the flexibility of the absorption arm 204 in addition to adjustable coupling members 206 allow the leak detection device 106 to be adapted to a range of different base portion of various devices or machines.

Figure 5:
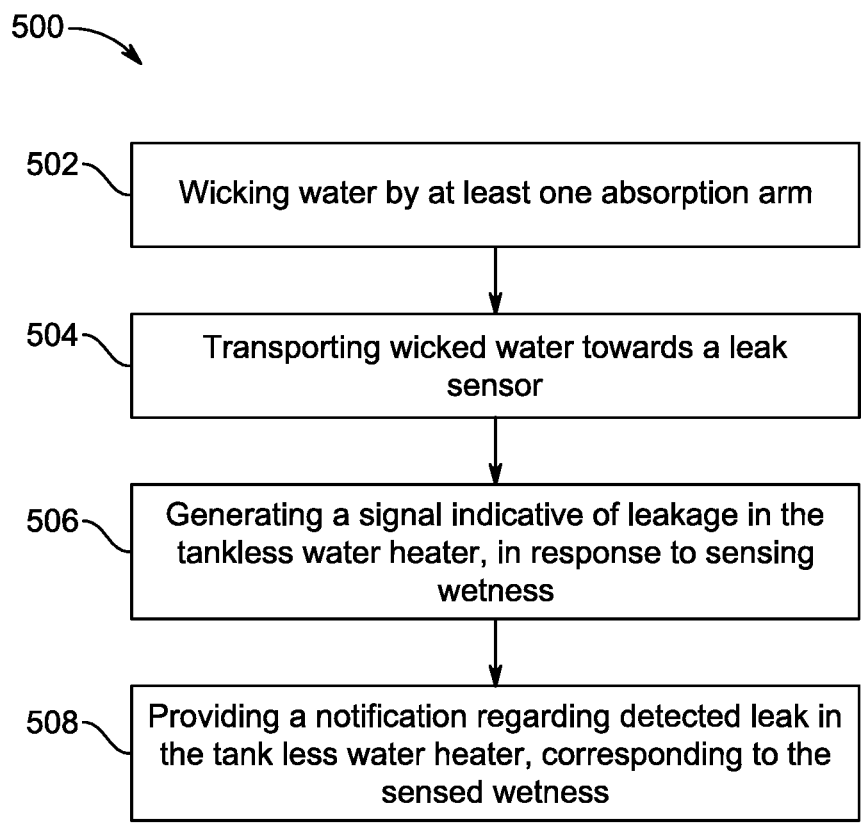
FIG. 5 is flowchart of a method of detecting leak in the tankless water heater, according to an embodiment of the present disclosure.

FIG. 5 illustrates a method 500 of detecting leak in the tankless water heater 102. The method 500 is described in conjunction with FIG. 1 to FIG. 3. In an embodiment, the method 500, at step 502, includes wicking water by at least one absorption arm 204. Preferably, the absorption arm 204 is disposed on the base 100 of the tankless water heater 102, such that portions of the absorption arm 204 is located proximal to the water outlets 104 defined in the base 100.

At step 504, the method 500 includes transporting the wicked water towards the leak sensor 202. In an aspect, the transporting of the wicked water is aided by virtue of capillary action exhibited by material of the absorption arm 204. At step 506, the method 500 includes generating the signal indicative of leakage in the tankless water heater 102, in response to sensing wetness. In an embodiment, the step of generating the signal may include causing a change in electrical resistance in the leak sensor 202 in response to sensing wetness. At step 508, the method 500 includes providing a notification regarding detected leak in the tankless water heater 102, corresponding to the sensed wetness. In an embodiment, the step of providing the notification may include actuating the notification device 210, by the controller 208, to provide the notification.

While aspects of the present disclosure have been particularly shown and described with reference to the embodiments above, it will be understood by those skilled in the art that various additional embodiments may be contemplated by the modification of the disclosed methods without departing from the spirit and scope of what is disclosed. For example, variations in orientation of the base 100 of the tankless water heater 102, dimensional characteristics the absorption arms 204, and number of coupling members 206 may be achieved through the additional embodiments. Such embodiments should be understood to fall within the scope of the present disclosure as determined based upon the claims and any equivalents thereof.

What is claimed is:

1. A leak detection device for a tankless water heater, comprising:
    a leak sensor; and
    at least one absorption arm extending from the leak sensor, the at least one absorption arm configured to (i) wick water, (ii) prevent condensation from flowing to the leak sensor based on the wicking and a length of the at least one absorption arm, and (iii) transport the wicked water towards the leak sensor,
    wherein a free end of the at least one absorption arm is positioned at a base of the tankless water heater more proximal than the leak sensor is to a water outlet of the base,
    wherein the leak sensor is configured to generate a signal indicative of leakage in the tankless water heater, in response to sensing wetness from the wicked water, and wherein the leak sensor is located at a distal end, opposite the free end, of the at least one absorption arm and is configured to sense the wetness from the wicked water after the wicked water has been wicked along the length of the at least one absorption arm without being sensed by the leak sensor along the length of the at least one absorption arm.

2. The leak detection device of claim 1, wherein the leak sensor is configured to couple with a notification device.

3. The leak detection device of claim 1, wherein a diameter of the at least one absorption arm is in a range of about 0.1 inches to about 0.2 inches.

4. The leak detection device of claim 1, wherein a thickness of wall of the at least one absorption arm is in a range of about 0.001 inches to about 0.1 inches.

5. The leak detection device of claim 1, wherein the leak sensor is configured to operate in a temperature range of about 30° F. to about 200° F.

6. The leak detection device of claim 1, wherein the leak sensor in configured to generate the signal based on an electrical resistance change corresponding to the sensed wetness.

7. The leak detection device of claim 1, wherein the at least one absorption arm is made of one of polyester, polypropylene, merino wool, nylon, or micromodal.

8. The leak detection device of claim 1, wherein the at least one absorption arm is configured to transport the wicked water along the length of the at least one absorption arm without the leak sensor detecting the leakage along the length.

9. The leak detection device of claim 1, wherein the at least one absorption arm extends the length of the at least one absorption arm from the leak sensor to a base of the tankless water heater, and wherein the leakage cannot be detected, by the leak sensor, along the length of the at least one absorption arm until the wicked water is transported from the base along the length of the at least one absorption arm to the leak sensor.

10. A tankless water heater comprising:
  a base comprising a water outlet;
  a leak detection device configured to detect a water leak in the tankless water heater, the leak detection device comprising:
    a leak sensor; and
    at least one absorption arm extending from the leak sensor, the at least one absorption arm configured to (i) wick water, (ii) prevent condensation from flowing to the leak sensor based on the wicking and a length of the at least one absorption arm, and (iii) transport the wicked water towards the leak sensor,
    wherein a free end of the at least one absorption arm is positioned more proximal than the leak sensor to a potential leak location of the tankless water heater,
    wherein the leak sensor is configured to generate a signal indicative of detected leakage in the tankless water heater, in response to sensing wetness from the wicked water, and wherein the leak sensor is located at a distal end, opposite the free end, of the at least one absorption arm and is configured to sense the wetness from the wicked water after the wicked water has been wicked along the length of the at least one absorption arm without being sensed by the leak sensor along the length of the at least one absorption arm; and
  a controller coupled with the leak detection device, and configured to:
    receive the signal from the leak sensor; and
    actuate a notification device to provide a notification regarding the detected leak in the tankless water heater.

11. The tankless water heater of claim 10, wherein the leak detection device is disposed on a base of the tankless water heater.

12. The tankless water heater of claim 10, wherein a free end of the at least one absorption arm is located away from condensation regions in the tankless water heater.

13. The tankless water heater of claim 10, wherein the at least one absorption arm is coupled to the base of the tankless water heater with one or more coupling members.

14. The tankless water heater of claim 10, wherein the at least one absorption arm is configured to transport the wicked water along the length of the at least one absorption arm without the leak sensor detecting the leakage along the length.

15. The tankless water heater of claim 10, wherein the at least one absorption arm extends the length of the at least one absorption arm from the leak sensor to a base of the tankless water heater, and wherein the leakage cannot be detected, by the leak sensor, along the length of the at least one absorption arm until the wicked water is transported from the base along the length of the at least one absorption arm to the leak sensor.

16. The tankless water heater of claim 13, wherein each coupling member is a magnetic clip, an adhesive, or a vacuum cup.

17. A method of detecting leak in a tankless water heater, the method comprising:
  wicking water, from a water outlet of a base of the tankless water heater, by at least one absorption arm comprising a free end positioned at the base more proximal than a leak sensor is to the water outlet;
  transporting, using the at least one absorption arm, wicked water towards the leak sensor at a distal end, opposite the free end, of the at least one absorption arm;
  generating, by a device, a signal indicative of leakage in the tankless water heater, in response to sensing, using the leak sensor, wetness from the wicked water, and wherein the leak sensor is configured to sense the wetness from the wicked water after the wicked water has been wicked along a length of the at least one absorption arm without being sensed by the leak sensor along the length of the at least one absorption arm; and
  providing, by the device, a notification regarding detected leak in the tankless water heater, corresponding to the sensed wetness.

18. The method of claim 17 further comprising causing a change in electrical resistance in the leak sensor in response to sensing the wetness.

19. The method of claim 17, wherein transporting the wicked water toward the leak sensor comprises transporting the wicked water along the length of the at least one absorption arm without detecting the leakage, wherein the leak sensor is configured to sense the wetness from the wicked water only after the wicked water reaches the leak sensor after being transported along the length of the at least one absorption arm.

20. The method of claim 17, wherein the at least one absorption arm extends the length of the at least one absorption arm from the leak sensor to a base of the tankless water heater, and wherein the leakage cannot be detected, by the leak sensor, along the length of the at least one absorption arm until the wicked water is transported from the base along the length of the at least one absorption arm to the leak sensor.

\* \* \* \* \*